United States Patent [19]
Manning

[11] Patent Number: 5,633,718
[45] Date of Patent: May 27, 1997

[54] SURFACE CURVATURE MEASUREMENT

[75] Inventor: Kevin R. Manning, Totton, England

[73] Assignee: Roke Manor Research Limited, Hampshire, England

[21] Appl. No.: 597,085

[22] Filed: Feb. 5, 1996

[30] Foreign Application Priority Data

Feb. 11, 1995 [GB] United Kingdom ............ 9502710
Dec. 5, 1995 [GB] United Kingdom ............ 9524883

[51] Int. Cl.$^6$ .................................................. G01B 11/24
[52] U.S. Cl. ........................ 356/376; 356/375; 356/371; 356/4.01
[58] Field of Search ........................... 356/371, 375, 356/376, 1, 4, 237, 240

[56] References Cited

U.S. PATENT DOCUMENTS 4,735,508  4/1988  Bellio .
5,067,817  11/1991  Glenn .

FOREIGN PATENT DOCUMENTS 2265215B  6/1995  United Kingdom .

*Primary Examiner*—Frank Gonzalez
*Assistant Examiner*—Reginald A. Ratliff
*Attorney, Agent, or Firm*—Keck, Mahin & Cate

[57] ABSTRACT

The apparatus measure the radius of curvature of a reflective or partially reflective surface 18, and comprises first and second lasers 2, 4 which generate two parallel beams a known distance apart. A lens 12 focuses the beams, which are passed via a beam splitter 14 and transform lens 16 to the surface 18. The beams are reflected back via the transform lens 16 and the beam splitter 14 onto a detector 20. A processor 22 calculates the radius of curvature of the surface in dependence of the known distance X separating the beams and the positions of the beams on the detector 20.

9 Claims, 4 Drawing Sheets

SURFACE CURVATURE MEASUREMENT

The invention relates to apparatus for the measurement of the radius of curvature of at least a partially reflective surface.

More especially but not exclusively it relates to apparatus for providing a simple, but accurate, 'statement' of whether the surface radius of curvature of a manufactured product or of a product being manufactured is within specification, together with an indication of how far it is from a required radius of curvature specification.

Apparatus for effecting surface radius of curvature measurement is known and in this connection attention is directed to our GB patent number 2265215B for background information.

An aim of the present invention is to provide apparatus which effectively measures the radius of curvature of the surface of at least a partially reflective surface.

According to the present invention there is provided apparatus for the measurement of the radius of curvature of a surface being at least partially reflective, comprising a source for generating at least first and second beams of electromagnetic radiation, which are parallel to each other and a known distance apart, first lens means for focusing said beams, a beam splitter positioned between said first lens means and said surface, second lens means positioned between said beam splitter and said surface, electromagnetic radiation detector means arranged to receive at least said first and second beams which are reflected from said surface via said second lens means and said beam splitter, and processing means for calculating said measurement in dependence upon the position of the reflected beams on the detector.

Various embodiments of the invention will now be described with reference to the accompanying drawings, in which.

Figure 1:
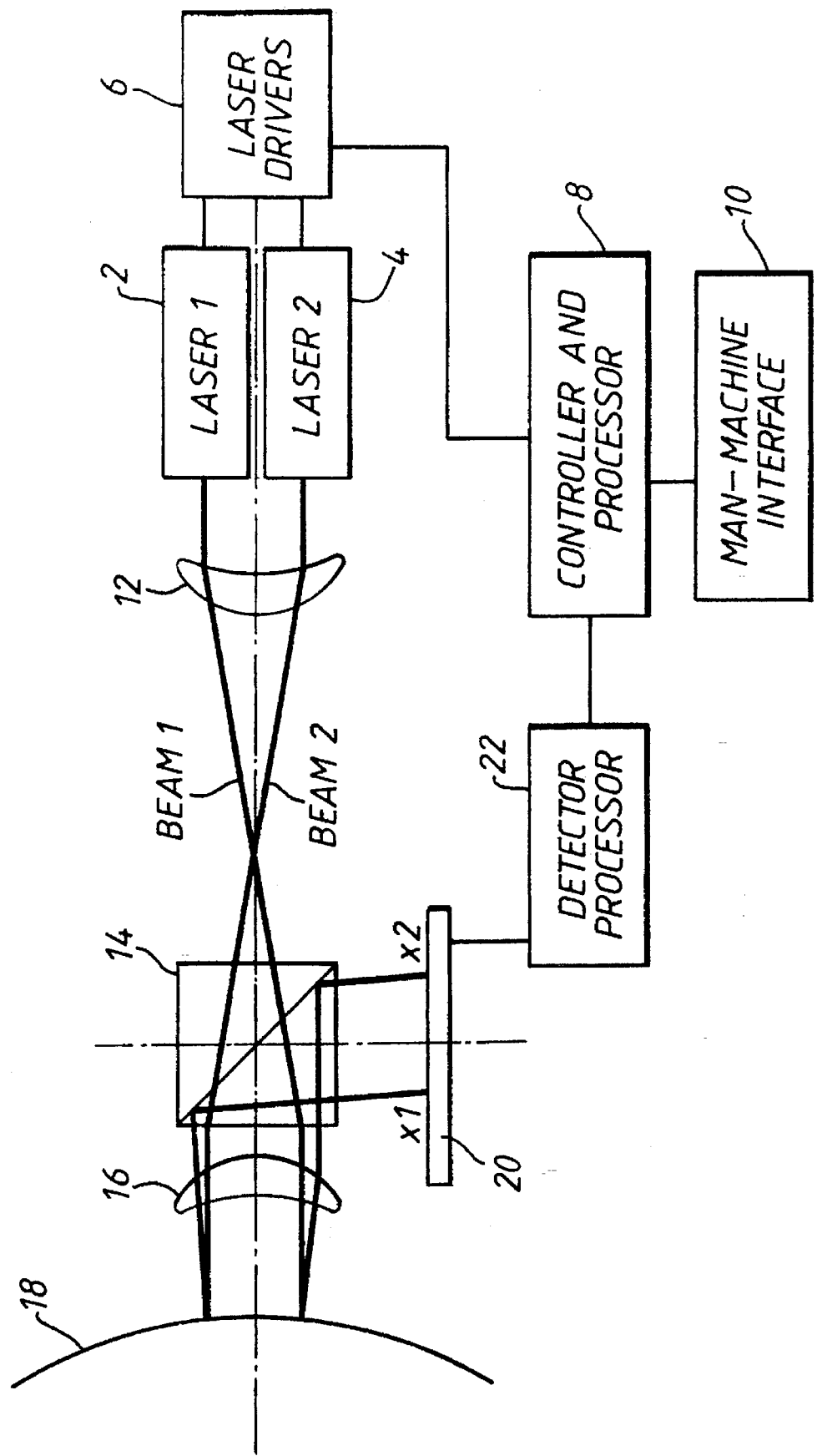
FIG. 1 shows a block diagram of apparatus for measuring the radius of curvature of a partially reflective surface.

In FIG. 1, the apparatus shown may be hand-held, but it will be appreciated that the apparatus may be fixed to a lathe stock or robot arm, for example.

Referring to FIG. 1, the hand-held apparatus comprises first and second sources of electromagnetic radiation 2, 4, which are lasers. The lasers are driven by laser drivers 6, which are controlled by a controller and processor circuit 8 having a man machine interface input 10. The lasers 2, 4 each produce a beam of electromagnetic radiation, which is passed through a focusing lens 12 into a beam splitter 14. The beams are parallel to each other and are a known distance apart. The beams pass through the beam splitter and into a transform lens 16, which directs beams towards a surface 18 to be measured. This surface may be a lens but could be any reflective or partially reflective surface which requires the radius of curvature to be measured. The surface reflects the beams 1, 2 back towards the transform lens, which in turn pass into the beam splitter and are directed onto the surface of a detector 20. These beams are identified as X1, X2. A detector processor 22 is arranged to calculate the radius of curvature of the surface based upon the positions of the reflected beams X1, X2 on the surface of the detector and upon the separation of the two beams at the surface 18. The detector 22 is controlled by the controller and processor circuit 8.

The lasers are diode lasers 2, 4 which emit in the visible range of wavelengths, and will thereby provide an indication to an operator of where the measurements are actually being made. The lasers emit collimated beams which are directed to a surface to be measured by various lenses and prisms as shown in FIG. 1. The beams are parallel with each other, and are a known distance apart.

The measurement method used is non-contact and potentially more accurate than a method using a spherometer, which is a contact instrument. In this embodiment, as shown in FIG. 1, two parallel beams, beam 1 and beam 2, a known distance apart impinge on a surface. When the beam returns are incident on the detector 20, the positions are stored in a memory in the detector processor 22 and used to calculate the radius of curvature.

Figure 2:
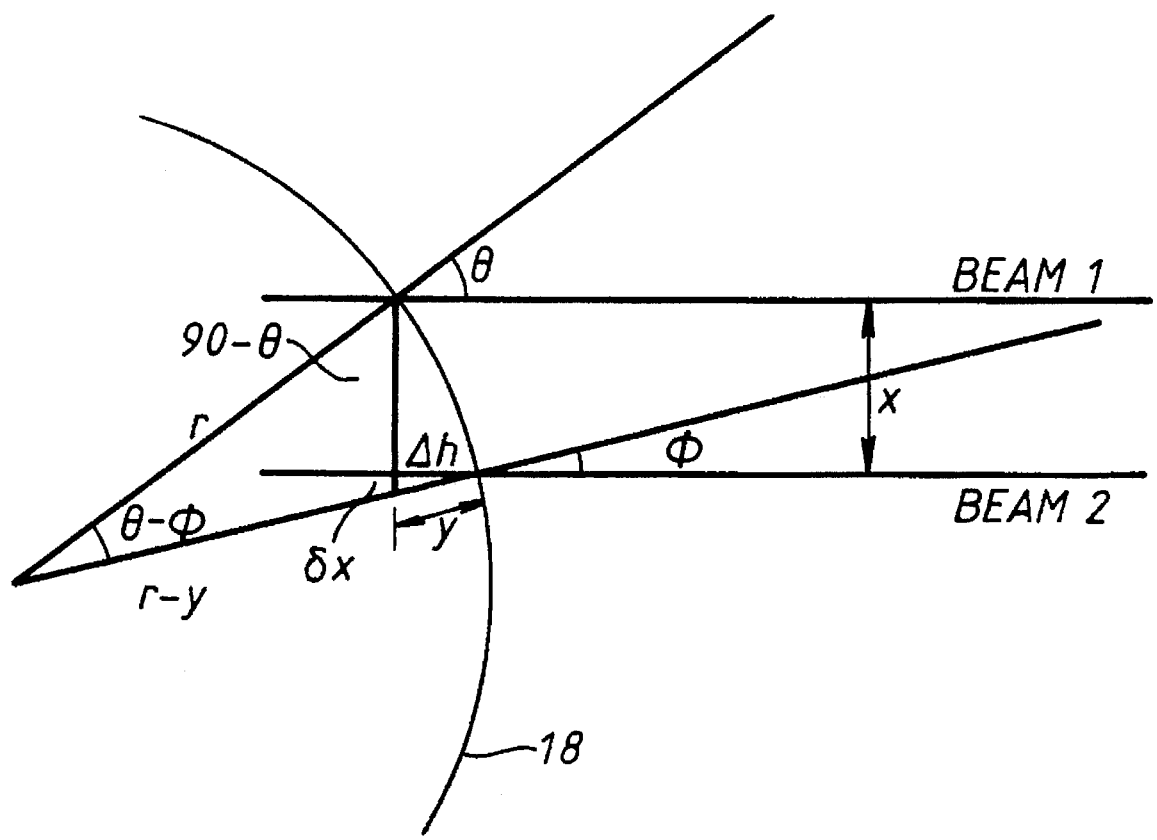
FIG. 2 shows the relationship between the angles measured and the distance between beam 1 and beam 2.

The diagram, as shown in FIG. 2, and related equations (discussed later) show that there is a simple relationship between the two measured angles, the distance between the beams and the required radius of curvature of the surface 18. In order to distinguish between the returns from the two input beams it is necessary to activate each beam separately such that the returns are uniquely identified, when using a position sensing diode in the detector 20. Another way to accomplish this would be to use polarised light and separate detectors for each polarisation. It should be noted that for widely spaced beams this method will only be accurate for spherical surfaces. However, if the beams are close to each other, so as to afford a sufficiently high sampling frequency, then the method will work for any smooth surface profile.

Figure 3:
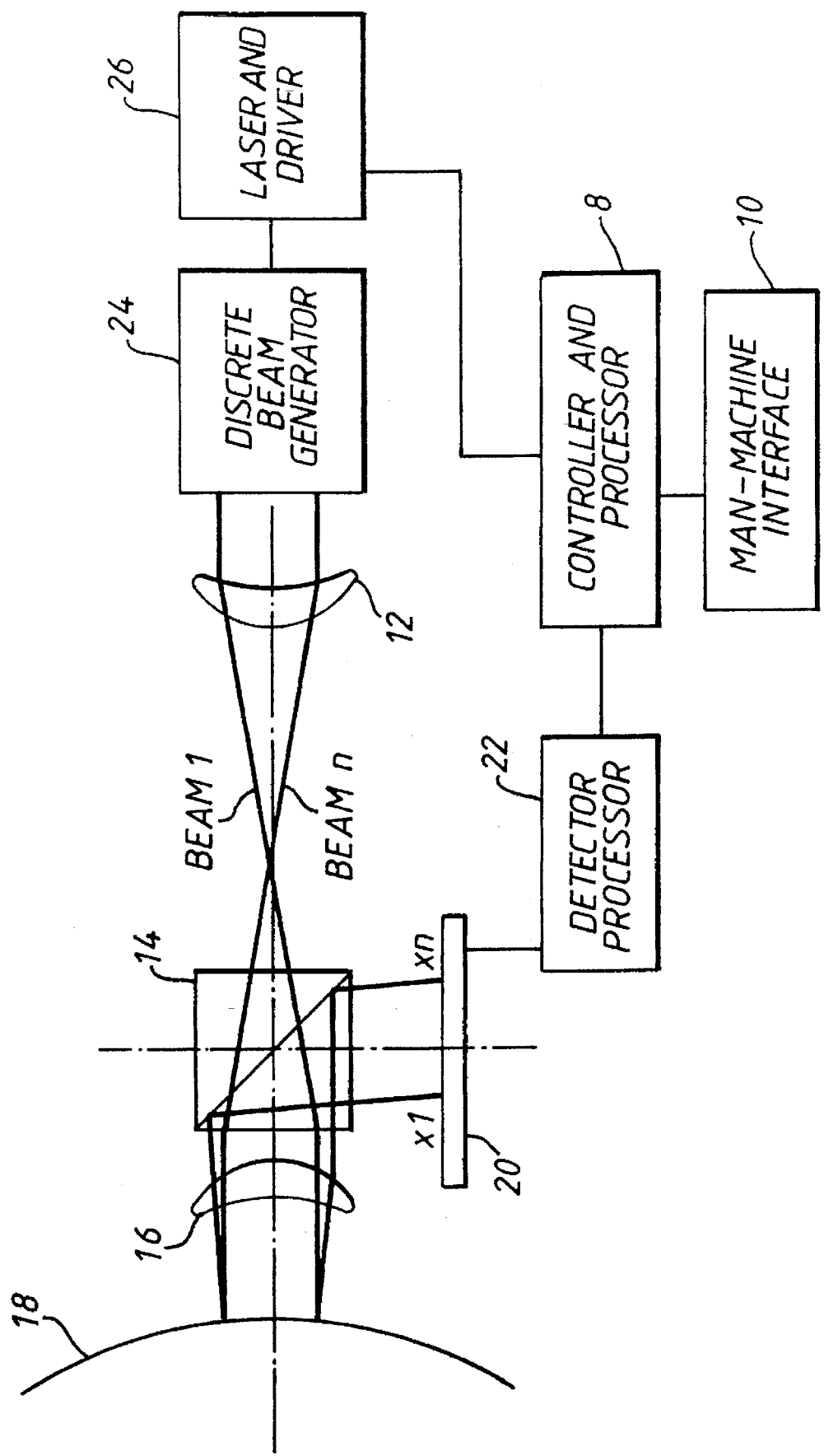
FIG. 3 shows a block diagram of a multibeam variant of the apparatus of FIG. 1; and, FIG. 4 shows the apparatus of FIG. 1 including a beam separation device.

Referring to FIG. 3, a variation of the device shown in FIG. 1 will now be discussed and shows a multibeam variant. Similar elements in FIG. 3 have been given the same designation as that of FIG. 1 and their functions are the same. The difference between FIG. 1 and FIG. 3 is that the electromagnetic source 2, 4 in FIG. 1, which were lasers, have been replaced by a discrete beam generator 24 which is driven by a laser and a laser driver 26. The discrete beam generator generates a plurality of beams, beam 1 to beam N, which are all parallel and where the distance X is known between any two beams. The beams are passed through the focusing lens 12 and thereafter are treated in exactly in the same manner as that discussed in relation to FIG. 1.

In this case a probe beam is scanned across the surface by having, for example, a scanning mirror/prism and appropriate optics, or an LCD light shutter, located in a discrete beam generator 24 in FIG. 3, thus providing continuous, or variable, sample intervals for providing a profile of the surface.

Figure 4:
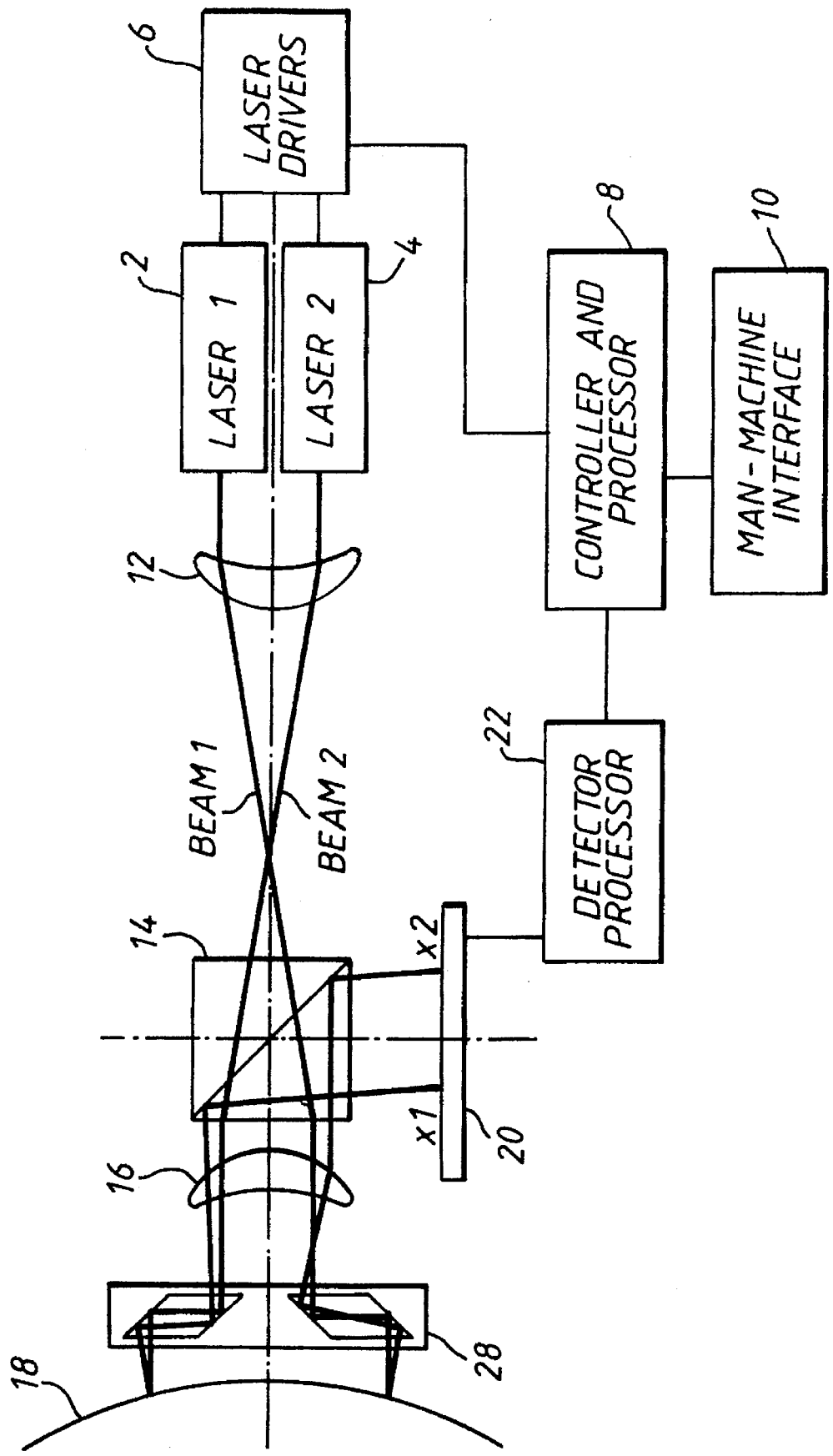

FIG. 4 is a block diagram of apparatus similar to FIG. 1, having an additional device 28 positioned between the surface to be measured 18 and the transform lens 16. Identical elements bear the same designations as in FIG. 1 and their operation is the same. The device 28 is effective to increase, or decrease, beam separation by having add-on optics which is attached to the transform lens 16, for example. The device 28 permits different sizes of lenses and different radii of curvature to be determined with accuracy.

The measurements could be accomplished in real time such that as a surface is machined the output from the unit is used to control a cutting tool, thus providing an automatic system which may be used to modify the machining as required, or stop when the required radius of curvature, or profile, is accomplished.

Although the units shown are eminently suitable for a hand held design, when the measurements are made the unit could, for example, alternatively be affixed to a lathe stock or temporarily affixed near a surface to be tested.

The following set of mathematical equations show how the radius of curvature, r, for two parallel beams a known distance, x, apart, as shown in FIG. 2 can be determined.

$$\frac{r}{\sin(90+\phi)} = \frac{r-y}{\sin(90-\theta)}$$

$$\frac{r(\sin(90-\theta))}{\sin(90+\phi)} = r-y$$

$$\rightarrow y = r - \frac{r(\sin(90-\theta))}{\sin(90+\phi)}$$

$$y = r - \frac{r\cos\theta}{\cos\phi}$$

$$y = r\left(1 - \frac{\cos\theta}{\cos\phi}\right)$$

$$y = r - \left(\frac{r(\sin(90-\theta))}{\sin(90+\phi)}\right) = r - \left(\frac{r\cos\theta}{\cos\phi}\right)$$

$$\delta x = y\sin(\phi) = (\sin\phi)\left(r - \left(\frac{r\cos\theta}{\cos\phi}\right)\right)$$

$$\frac{x+\delta x}{\sin(\theta-\phi)} = \frac{r}{\sin(90+\phi)} = \frac{r}{\cos\phi}$$

$$\rightarrow r = \frac{(x+\delta x)}{\sin(\theta-\phi)}(\cos\phi)$$

$$r = \left\{x + \left[\sin\phi\left(r - \left(\frac{r\cos\theta}{\cos\phi}\right)\right)\right]\right\}\frac{\cos\phi}{\sin(\theta-\phi)}$$

$$r = \left\{x + \left[r\sin\phi\left(1 - \left(\frac{\cos\theta}{\cos\phi}\right)\right)\right]\right\}\frac{\cos\phi}{\sin(\theta-\phi)}$$

$$r = \frac{x\cos\phi}{\sin(\theta-\phi)} + r\sin\phi\left(1 - \frac{\cos\theta}{\cos\phi}\right)\frac{\cos\phi}{\sin(\theta-\phi)}$$

$$r = \frac{x\cos\phi}{\sin(\theta-\phi)\left(1 - \frac{\sin\phi\cos\phi}{\sin(\theta-\phi)}\left(1 - \frac{\cos\theta}{\cos\phi}\right)\right)}$$

$$r = \frac{x\cos\phi}{\frac{\sin(\theta-\phi)}{\sin(\theta-\phi)}\left[\sin(\theta-\phi) - \sin\phi\cos\phi\left(1 - \frac{\cos\theta}{\cos\phi}\right)\right]}$$

$$r = \frac{x\cos\phi}{\sin(\theta-\phi) - \sin\phi(\cos\phi - \cos\theta)}$$

$$r = \frac{x\cos\phi}{\sin\theta\cos\phi - \cos\theta\sin\phi - \sin\phi\cos\phi + \sin\phi\cos\theta}$$

$$r = \frac{x\cos\phi}{\sin\theta\cos\phi - \sin\phi\cos\phi}$$

$$r = \frac{x}{\sin\theta - \sin\phi}$$

where:
r=required radius curvature
y=distance from intersect of perpendicular from upper radius normal with lower radius normal
x=beam separation
∂x=extra distance between x and intersect with lower radius normal
θ=upper measured angle of surface normal
φ=lower measured angle of surface normal In addition, it is possible to derive the height of the surface from a plane surface by the following:

$$\Delta h = y\cos\phi$$

-continued $$y = r - \left(\frac{r\cos\theta}{\cos\phi}\right)$$

$$r = \frac{x}{\sin\theta - \sin\phi}$$

therefore:

$$\Delta h = \frac{x\cos\phi}{\sin\theta - \sin\phi}\left[1 - \frac{\cos\theta}{\cos\phi}\right]$$

where:

Δh=height between impact points of the incident beams.

By using wavelength diversity for each of the lasers one can isolate the lasers by wavelength filters and use linear detectors for each wavelength. Using this technique it is possible to have the beams very close together, (i.e. x is small), and still have resolution between the returns. This can be of benefit to a mechanically scanned measuring unit whereby improved resolution of the radius of the curvature is obtained.

It will be appreciated by those skilled in the art that the beam splitter described is intended to include any means for causing beam separation, for example, partially reflective mirrors.

I claim:

1. Apparatus for the measurement of the radius of curvature of a surface being at least partially reflective, comprising a source for generating at least first and second beams of electromagnetic radiation, which are parallel to each other and a known distance apart, first lens means for focusing said beams, a beam splitter positioned between said first lens means and said surface, second lens means positioned between said beam splitter and said surface, electromagnetic radiation detector means arranged to receive at least said first and second beams which are reflected from said surface via said second lens means and said beam splitter, and processing means for calculating said measurement in dependence upon the position of the reflected beams on the detector.

2. Apparatus as claimed in claim 1, wherein control means is provided for controlling the detector and the source of electromagnetic radiation.

3. Apparatus as claimed in claim 2, wherein the source comprises first and second lasers, and the control means controls a laser driver for each laser.

4. Apparatus as claimed in claim 1, wherein a beam generating means generates a plurality of beams which are passed through said first lens means.

5. Apparatus as claimed in claim 4, wherein the beams are generated from a single laser source.

6. Apparatus as claimed in claim 4, wherein the beams are generated from a plurality of laser sources.

7. Apparatus as claimed in claim 1, wherein a beam separation device is positioned between said second lens means and said surface and is arranged to increase or decrease the beam separation.

8. Apparatus as claimed in claim 1, wherein the surface to be measured is a lens.

9. Apparatus as claimed in claim 1, wherein said apparatus is hand-held.

* * * * *